T. B. POWERS AND W. FUHRMANN.
CALIPER.
APPLICATION FILED OCT. 2, 1919.
1,345,236.
Patented June 29, 1920.
2 SHEETS—SHEET 1.
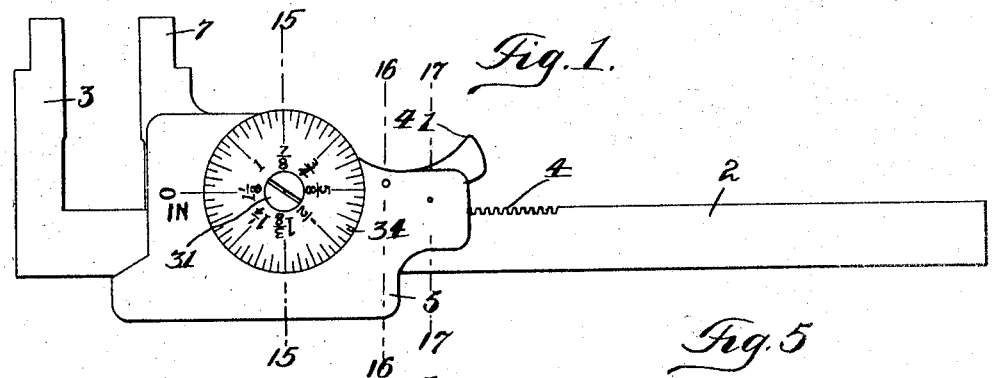
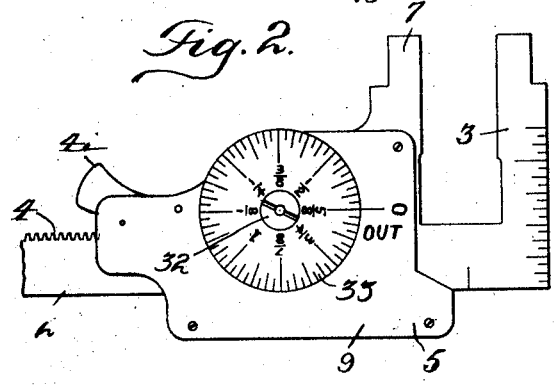
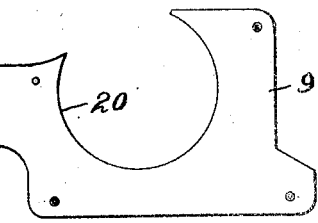
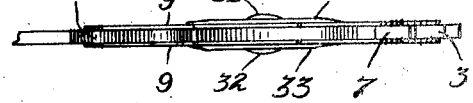
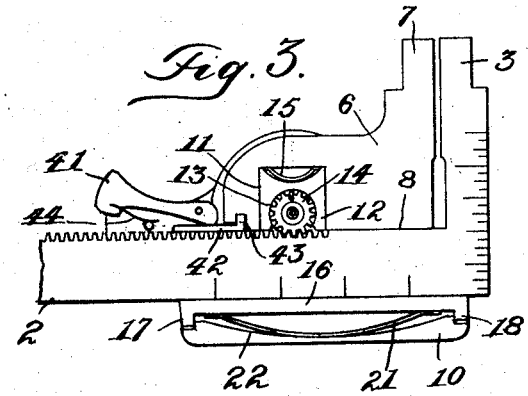
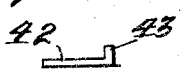
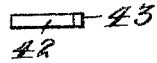
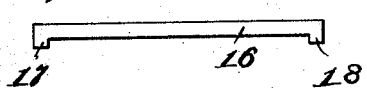
Inventors:
Timothy B. Powers,
Warren Fuhrmann,
By Wm. H. Reid.
Attorney

T. B. POWERS AND W. FUHRMANN.
CALIPER.
APPLICATION FILED OCT. 2, 1919.

1,345,236.

Patented June 29, 1920.
2 SHEETS—SHEET 2.

Inventors:
Timothy B. Powers,
Warren Fuhrmann,
By Wm. H. Reid, Attorney

UNITED STATES PATENT OFFICE.

TIMOTHY B. POWERS, OF BROOKLYN, NEW YORK, AND WARREN FUHRMANN, OF WESTFIELD, NEW JERSEY.

CALIPER.

1,345,236.  Specification of Letters Patent.  Patented June 29, 1920.

Application filed October 2, 1919. Serial No. 327,939.

*To all whom it may concern:*

Be it known that we, TIMOTHY B. POWERS, a citizen of the United States, and a resident of Brooklyn, county of Kings, and State of New York, and WARREN FUHRMANN, a citizen of the United States, and a resident of Westfield, county of Union, and State of New Jersey, have invented certain new and useful Improvements in Calipers, of which the following is a specification.

This invention relates to instruments of precision, for measuring both the inside and the outside dimensions of various parts.

The object of the invention is to produce a device of this character that can be quickly shifted to engage the article, and which will give the reading at once of the dimension, and which will remain accurate after long use, and which will show the readings by a scale larger than the actual dimensions.

A further object is to provide a device of this character in which the moving parts will be retained in engagement by a yielding pressure, and in which the wear will be of minimum amount.

A further object of the invention is to provide dials on the indicating disks that can be adjusted to calibrate the instrument when first assembled and to correct for wear in the several parts.

Another object of the invention is to provide a means for locking the slide in various positions, that can be readily released by the finger of the operator.

In the accompanying drawing showing one embodiment of our invention, Figure 1 is a side elevation, showing the reading for inside measurement.

Fig. 2 shows the reverse side of the caliper, indicating outside measurement.

Fig. 3 is a view similar to Fig. 1 with one of the side plates and dials removed.

Fig. 4 is a plan view.

Fig. 5 shows one of the side plates.

Fig. 6 shows the gib.

Fig. 7 shows the spring-pressed bar.

Fig. 8 shows the gear plate.

Figs. 9 and 10 show the locking lever.

Figs. 11 and 12 show the lever plate.

Figure 13:
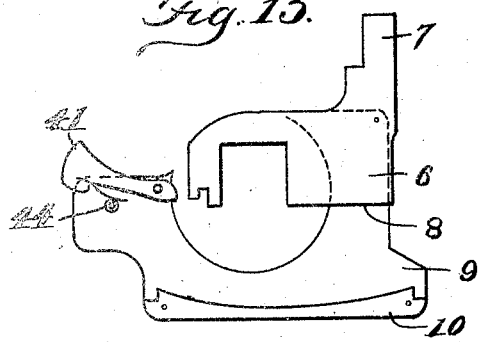
Fig. 13 shows the device partly assembled.
Figure 14:
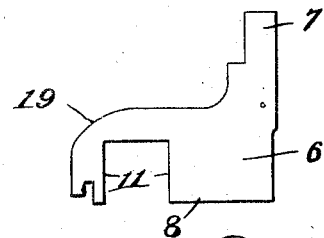
Fig. 14 shows one of the side plates.

Referring to the drawings, the device comprises a shank or bar 2 having an arm 3 at one end extending at a right angle. The bar is provided with teeth on one edge forming a rack 4. On this bar slides a frame member denoted generally by 5 that slides along the bar and engages the rack by a gear member. This frame member comprises essentially a body plate 6 having an arm 7 at one end, the lower edge 8 of the body plate being arranged to slide along the rack edge of the shank, to cause the arm 7 to be brought against the arm 3, and to recede therefrom so that an article whose outside dimension is to be determined, can be placed between the arms 3 and 7 that will engage the article on opposite sides.

The body plate 6 has a pair of side plates 9 secured on opposite sides thereof, as indicated in Fig. 4, and a bottom bar or gib 10 is secured between the lower edges of the two plates 9, see Fig. 3. These parts thereby inclose a slot or channel through which the shank 2 slides.

The body plate 6 is provided with an opening 11 extending in from the lower edge 8, shown as having parallel sides to guide a gear plate 12, see Fig. 8. This plate 12 has a circular opening 13 slightly greater than a half circle, to receive and hold therein a gear 14, that can mesh with the rack 4 on the shank, as shown in Fig. 3, when the plate 12 is moved downward in the opening 11. A small plate spring 15 is placed between the upper curved edge of the gear plate 12, and the bottom wall of the opening 11 in the body plate 6, as shown. This will force the gear plate 12 toward the shank and press the gear into the rack.

Means are further provided for forcing the rack edge of the shank against the lower edge 8 of the body plate 6. As shown, a bar 16 having lugs 17 and 18 at its extremities, slides in the slot of the frame member. A plate spring 21 is tensioned between the upper curved edge 22 of the bottom gib 10, and the lower edge of the bar 16 that will press the bar against the lower edge of the shank, and force the shank upwardly in the bar of the frame to engage the body plate 6.

Figures 15, 18:
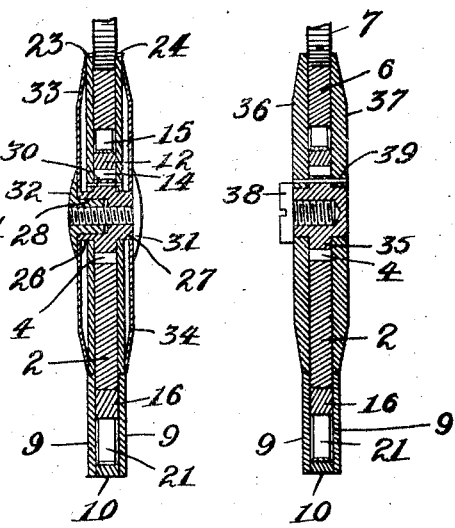
Fig. 15 is a section on the line 15—15 of Fig. 1.
Fig. 18 is a section through a modification.
Figure 19:
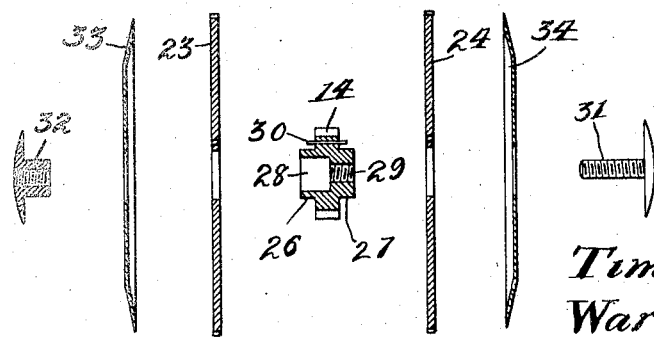
Fig. 19 is a collective view of the disks and dials and connecting parts.

In the circular opening 20 of the two side plates 9, is arranged a pair of disks 23 and 24 mounted on the gear 14 having hubs 26 and 27, see Figs. 15, 19. This hub has a large bore 28 on one side and a reduced threaded bore 29 on the other side. The two disks 23 and 24 are placed on these hubs and may be secured by a pin 30 passing through the gear and the disks. A screw 31 is passed through the threaded bore, and a nut 32 is passed into the large bore to engage the screw, which will serve to clamp the disks to the gear. Instead of having the marginal graduations on these disks that are locked to the gear, I provide dials 33 and 34 whose bores receive the screw and nut and are thereby clamped to the disks 23 and 24, see Fig. 15. By this means the nut and screw can be loosened and the dials adjusted on the disks and hence moved relative to the gear. It will be seen from Figs. 15-17, also 19, that the dials 33 and 34 are of slightly less diameter than the disks 23 and 24.

Figures 16, 17:
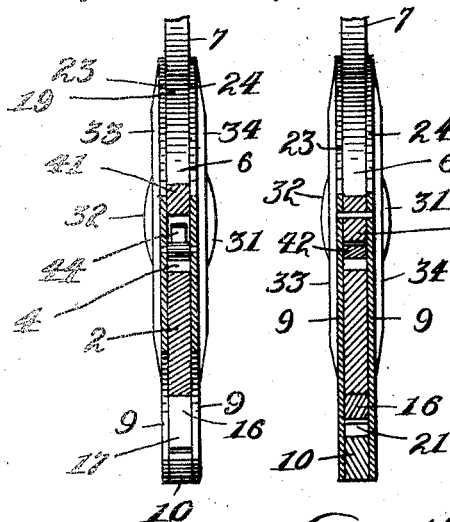
Fig. 16 is a section on the line 16—16 of Fig. 1.
Fig. 17 is a section on the line 17—17 of Fig. 1.

It will be understood that the gear 14 is first placed in the frame plate 12 that slides in the slot in the body plate 6, see Fig. 3, and the two side plates 9, containing the bar 10 and the gib, secured to the body plate. The attachment of the disks and dials to the gear in this position will serve to lock these parts together, as indicated in Figs. 15-17. The disks 23 and 24 project slightly beyond the curved edge 19 of the body plate and are preferably milled for engagement by the finger of the operator. Turning these disks will rotate the gear and slide the body plate and attached parts, to move the arm 7 relative to the arm 3 of the shank, causing approach or recession. This will cause the graduations on the disks to move past a suitable index 0, on each side plate. One side may indicate the outside measurement of the index that may be placed between the arms 3 and 7. The graduations of the other disk or dial will indicate the inside measurement caused by placing the arms 3 and 7 between opposed surfaces whose distance apart is to be determined.

In Fig. 18 a slight modification is shown in which the gear 35 has disks 36 and 37 on its hubs, disk 36 being a driving fit to be retained on the hub. A screw 38 secures the disk 36 to the hub. A pin 39 passes through the disks and hub. The attachment to the other parts is the same as shown in Fig. 15. The disks 36 and 37 are provided with marginal graduations to register with the marks on the frame, similar to the dials 33 and 34.

We also provide a clamping means to hold the sliding member on the shank in its several positions. As shown, we pivot a lever 41 between the two side plates, see Fig. 3. A strip 42 has a lug 43 that enters a socket in an opening in the body plate 6, and is engaged by the end of the lever 41 that is pressed by a plate spring 44, against the strip 42, see Fig. 3. The projecting end of the lever 41 can be readily engaged by the thumb of the operator to release the slide for movement along the shank, and as soon as released the lever will lock the slide in the adjusted position.

The dial 33 is used to register the outside measurement of an object by indicating the exact distance apart of the inner opposed walls of the arms 3 and 7, as shown in Fig. 2. In this view the dial 33, that is provided with graduations on its edge, is the character ⅜ in register with a mark 0, on the frame plate 9, as shown. The approach or recession of these arms will obviously rotate the gear, that is designed to make one rotation for each inch of travel, and the dial 33 will make one rotation. Its circumference is divided into fractions that will indicate one inch for the entire circumference, which will be much greater than the actual travel, as the diameter of the disk exceeds the diameter of the gear. In the same manner the opposite dial 34 is graduated, so that when the arms are together, the distance apart of their opposed outer walls will be indicated adjacent the mark 0, which is shown in Fig. 1 as one-half inch, which is for inside measurement.

Having thus described our invention, what we claim is:—

1. In a caliper, the combination of a bar having a rack on one edge and an arm at one end, a frame having an aperture in which slides the bar, the frame having an opening extended inward from the edge adjacent the bar rack and open to both sides of the frame, a plate slidable in the said frame opening toward and from the bar, the plate having a circular socket extending inward from the edge adjacent the bar, a gear located in said plate socket and meshing with the bar rack, a spring between the plate and the bottom wall of the frame opening arranged to cause the plate to press the gear against the bar rack, and disks one rigidly secured to each face of the gear and which lap the margins of the frame opening whereby to retain the plate and gear in the frame.

2. In a caliper, the combination of a bar having a rack on one edge and an arm at one end, a frame having an aperture in which slides the bar, the frame having an opening extended inward from the edge adjacent the bar rack and open to both sides of the frame, a plate slidable in the said frame opening toward and from the bar, the plate having a circular socket extending inward from the edge adjacent the bar, a gear located in said plate socket and meshing with the bar rack, a spring between the plate and the bottom wall of the frame opening arranged to cause the plate to press the gear against the bar rack, and disks one rigidly secured to each face of the gear and which lap the margins of the frame opening whereby to retain the plate and gear in the frame, the disks having the edges adjacent the bar exposed for engagement by the operator.

3. In a caliper, the combination of a bar having a rack on one edge and an arm at one end, a frame having an aperture in which slides the bar, the frame having an opening extended inward from the edge adjacent the bar rack and open to both sides of the frame, a plate slidable in the said frame opening toward and from the bar, the plate having a circular socket extending inward from the edge adjacent the bar, a gear located in said plate socket and meshing with the bar rack, a spring between the plate and the bottom wall of the frame opening arranged to cause the plate to press the gear against the bar rack, and dials one rigidly secured to each face of the gear and which lap the margins of the frame opening whereby to retain the plate and gear in the frame, the dials having graduations on the margins that are different on the two sides and a mark on each side of the frame to register with said graduations.

4. In a caliper, the combination of a bar having a rack on one edge and an arm at one end, a frame having an aperture in which slides the bar, the frame having an opening extended inward from the edge adjacent the bar rack and open to both sides of the frame, a gear located in said plate opening and meshing with the bar rack, a spring arranged to press the gear and the bar rack together, and disks one rigidly secured to each face of the gear and which lap the margins of the frame opening whereby to retain the gear in the frame.

5. In a caliper, the combination of a bar having a rack on one edge and an arm at one end, a frame having an aperture in which slides the bar, the frame having an opening extended inward from the edge adjacent the bar rack and open to both sides of the frame, a gear located in said plate opening and meshing with the bar rack, a spring arranged to press the gear and the bar rack together, and disks one rigidly secured to each face of the gear and which lap the margins of the frame opening whereby to retain the gear in the frame, the disks having the edges adjacent the bar exposed for engagement by the operator.

6. In a caliper, the combination of a bar having a rack on one edge and an arm at one end, a frame having an aperture in which slides the bar, the frame having an opening extended inward from the edge adjacent the bar rack and open to both sides of the frame, a gear located in said plate opening and meshing with the bar rack, a spring arranged to press the gear and the bar rack together, and dials one rigidly secured to each face of the gear and which lap the margins of the frame opening whereby to retain the gear in the frame, the dials having graduation on the margins that are different on the two sides, there being a mark on each side of the frame to register with said graduations.

7. In a caliper, the combination of a bar having a rack on one edge and an arm at one end, a frame having an aperture in which slides the bar, the frame having an opening extended inward from the edge adjacent the bar rack and open to both sides of the frame, a gear located in said plate opening and meshing with the bar rack, a spring arranged to press the gear and the bar rack together, and disks one rigidly secured to each face of the gear and which lap the margins of the frame opening whereby to retain the gear in the frame, the frame having a socket extending inward from the bar edge opposite the rack, and a spring in said latter socket arranged to cause the bar to press against the opposite side of the frame bore.

8. In a caliper, the combination of a bar having a rack on one edge and an arm at one end, a frame having a bore in which slides the bar, the frame having an opening extended inward from the edge adjacent the bar rack and open to both sides of the frame, a plate slidable in the said frame opening toward and from the bar, the plate having a circular socket extending inward from the edge adjacent the bar, a gear located in said plate socket and meshing with the bar rack, a spring between the plate and the bottom wall of the frame opening arranged to cause the plate to press the gear against the bar rack, and disks one rigidly secured to each face of the gear and which lap the margins of the frame opening whereby to retain the plate and gear in the frame, the frame having a socket extending inward from the bar edge opposite the rack, and a spring in said latter socket arranged to cause the bar to press against the opposite side of the frame bore.

9. In a caliper, the combination of a bar having a rack on one edge and an arm at one end, a frame having an aperture in which slides the bar, the frame having an opening extended inward from the edge adjacent the bar rack and open to both sides of the frame, a gear located in said plate opening and meshing with the bar rack, a spring arranged to press the gear and the bar rack together, and disks one rigidly secured to each face of the gear and which lap the margins of the frame opening whereby to retain the gear in the frame, the frame having a socket extending inward from the bar edge opposite the rack, a strip in said socket guided to slide toward the bar, and a spring in said latter socket arranged to press the strip against the bar to force it against the opposite side of the socket.

10. In a caliper, the combination of a bar having a rack on one edge and an arm at one end, a frame having an aperture in which slides the bar, the frame having an opening extended inward from the edge adjacent the bar rack and open to both sides of the frame, a plate slidable in the said frame opening toward and from the bar, the plate having a circular socket extending inward from the edge adjacent the bar, a gear located in said plate socket and meshing with the bar rack, a spring between the plate and the bottom wall of the frame opening arranged to cause the plate to press the gear against the bar rack, and disks one rigidly secured to each face of the gear and which lap the margins of the frame opening whereby to retain the plate and gear in the frame, the frame having a socket extending inward from the bar edge opposite the rack, a strip in said socket guided to slide toward the bar, and a spring in said latter socket arranged to press the strip against the bar to force it against the opposite side of the socket.

11. In a caliper, the combination of a bar having a rack on one edge and an arm at one end, a frame having an aperture in which slides the bar, a gear carried by said plate and meshing with the bar rack, dials one rigidly secured to each face of the gear, the dials having graduation on the margins that are different on the two dials, there being a mark on each side of the frame to register with said graduations.

12. In a caliper, the combination of a bar having a rack on one edge and an arm at one end, a frame having an aperture in which slides the bar, a gear carried by said plate and meshing with the bar rack, dials one rigidly secured to each face of the gear, the dials having graduation on the margins that are different on the two dials, there being a mark on each side of the frame to register with said graduations, the graduations on one dial indicating outside measurement between the frame and the bar arm, and the graduations on the other dial indicating inside measurement by the outer faces of the arm and frame.

13. In a caliper, the combination of a bar having a rack on one edge and an arm at one end, a frame having an aperture in which slides the bar, the frame having an opening, a gear located in said frame opening and meshing with the bar rack, and disks one rigidly secured to each face of the gear and which lap the margins of the frame opening whereby to retain the gear in the frame.

14. In a caliper, the combination of a bar having a rack on one edge and an arm at one end, a frame having an aperture in which slides the bar, the frame having an opening, a gear located in said frame opening and meshing with the bar rack, and disks one rigidly secured to each face of the gear and which lap the margins of the frame opening whereby to retain the gear in the frame, the disks having the edges adjacent the bar exposed for engagement by the operator.

15. In a caliper, the combination of a bar having a rack on one edge and an arm at one end, a frame having an aperture in which slides the bar, the frame having an opening extended inward from the edge adjacent the bar rack and open to both sides of the frame, a gear located in said frame opening and meshing with the bar rack, a spring arranged to press the gear and the bar rack together, and disks one rigidly secured to each face of the gear and which lap the margins of the frame opening whereby to retain the gear in the frame, and a cam lever on the frame to lock it to the bar in adjusted positions.

16. In a caliper, the combination of a bar having a rack on one edge and an arm at one end, a frame having an aperture in which slides the bar, the frame having an opening extended inward from the edge adjacent the bar rack and open to both sides of the frame, a plate slidable in the said frame opening toward and from the bar, the plate having a circular socket extending inward from the edge adjacent the bar, a gear located in said frame socket and meshing with the bar rack, a spring between the plate and the bottom wall of the frame opening arranged to cause the plate to press the gear against the bar rack, and disks one rigidly secured to each face of the gear and which lap the margins of the frame opening whereby to retain the plate and gear in the frame, and a cam lever on the frame to lock it to the bar in adjusted positions.

17. In a caliper, the combination of a bar having a rack on one edge and an arm at one end, a frame having an aperture in which slides the bar, the frame having an opening extended inward from the edge adjacent the bar rack and open to both sides of the frame, a gear located in said frame opening and meshing with the bar rack, a spring arranged to press the gear and the bar rack together, and disks one rigidly secured to each face of the gear and which lap the margins of the frame opening whereby to retain the gear in the frame, and a thin marginally graduated dial adjustably secured to each said disk.

18. In a caliper, the combination of a bar having a rack on one edge and an arm at one end, a frame having an aperture in which slides the bar, the frame having an opening extended inward from the edge adjacent the bar rack and open to both sides of the frame, a gear located in said frame opening and meshing with the bar rack, a spring arranged to press the gear and the bar rack together, and disks one rigidly secured to each face of the gear and which lap the margins of the frame opening whereby to retain the gear in the frame, and a thin marginally graduated dial adjustably secured to each said disk and of slightly less diameter.

19. In a caliper, the combination of a bar having a rack on one edge and an arm at one end, a frame having an aperture in which slides the bar, the frame having an opening, a gear located in said frame opening and meshing with the bar rack, and disks one rigidly secured to each face of the gear and which lap the margins of the frame opening whereby to retain the gear in the frame, and a thin marginally graduated dial adjustably secured to each said disk.

20. In a caliper, the combination of a bar having a rack on one edge and an arm at one end, a frame having an aperture in which slides the bar, the frame having an opening, a gear located in said frame opening and meshing with the bar rack, and disks one rigidly secured to each face of the gear and which lap the margins of the frame opening whereby to retain the gear in the frame, and a thin marginally graduated dial adjustably secured to each said disk and of slightly less diameter.

Signed this 28th day of August, 1919.

TIMOTHY B. POWERS.
WARREN FUHRMANN